Figure 1:
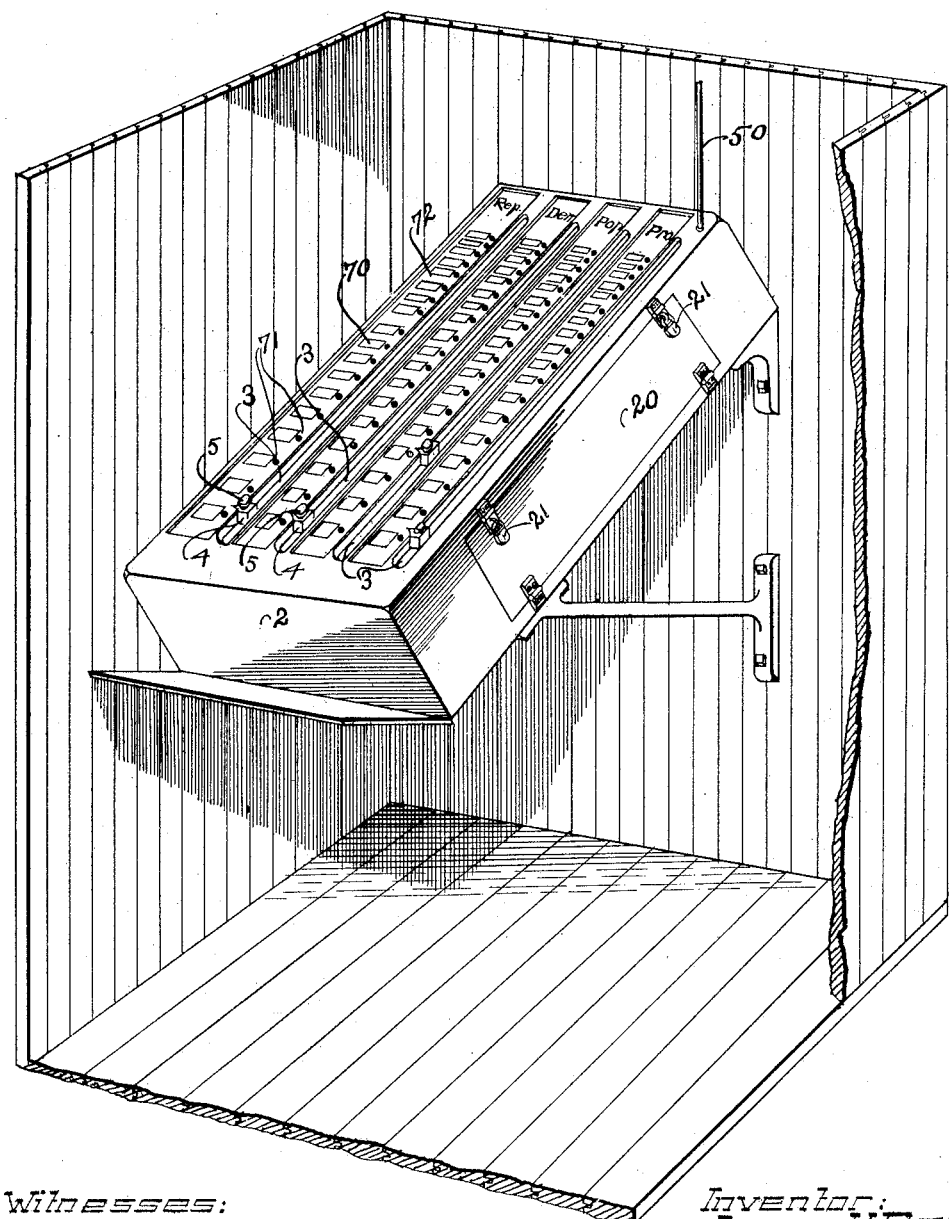

No. 622,191. Patented Mar. 28, 1899.
J. H. DEAN.
VOTING MACHINE.
(Application filed May 17, 1897.)
(No Model.) 8 Sheets—Sheet 1.

Witnesses:
W. Pierce Cowles,
M. E. Gooley.

Inventor:
James H. Dean.
Paul O. Hawley
By his attorneys.

No. 622,191. Patented Mar. 28, 1899.
J. H. DEAN.
VOTING MACHINE.
(Application filed May 17, 1897.)
(No Model.) 8 Sheets—Sheet 2.

Witnesses:
W. Pierce Cowles
M. E. Gooley

Inventor.
James H. Dean.
By Paul Hawley
his attorneys.

No. 622,191. Patented Mar. 28, 1899.
J. H. DEAN.
VOTING MACHINE.
(Application filed May 17, 1897.)
(No Model.) 8 Sheets—Sheet 3.

Witnesses:
W. Pierce Cowles
M. E. Gooley

Inventor:
James H. Dean.
By Paul O. Hawley
his attorneys.

THE NORRIS PETERS CO., PHOTO-LITHO., WASHINGTON, D. C.

No. 622,191. Patented Mar. 28, 1899.
J. H. DEAN.
VOTING MACHINE.
(Application filed May 17, 1897.)
(No Model.) 8 Sheets—Sheet 4.
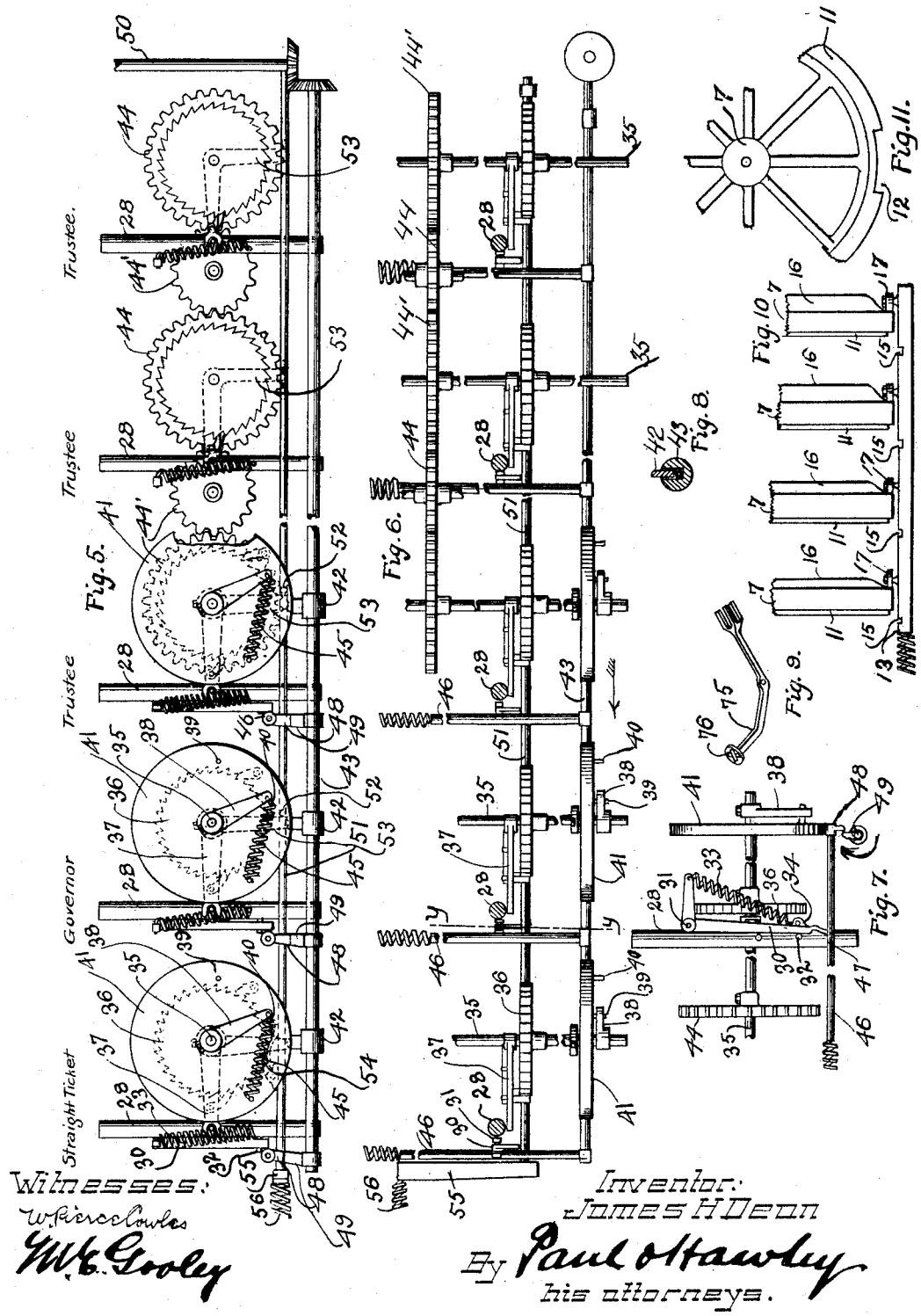
Witnesses:
W. Pierce Cowles
G. W. E. Gooley
Inventor:
James H Dean
By Paul O Hawley
his attorneys.

No. 622,191. Patented Mar. 28, 1899.
J. H. DEAN.
VOTING MACHINE.
(Application filed May 17, 1897.)
(No Model.) 8 Sheets—Sheet 5.
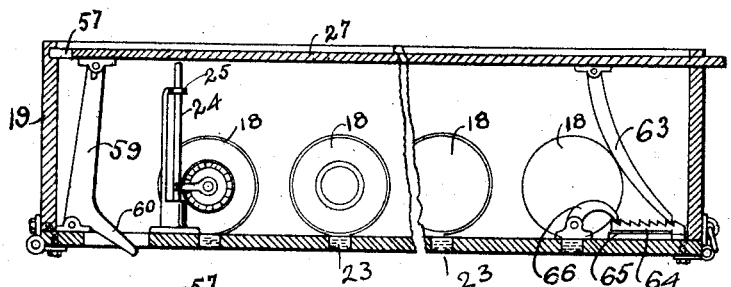
Fig. 13.
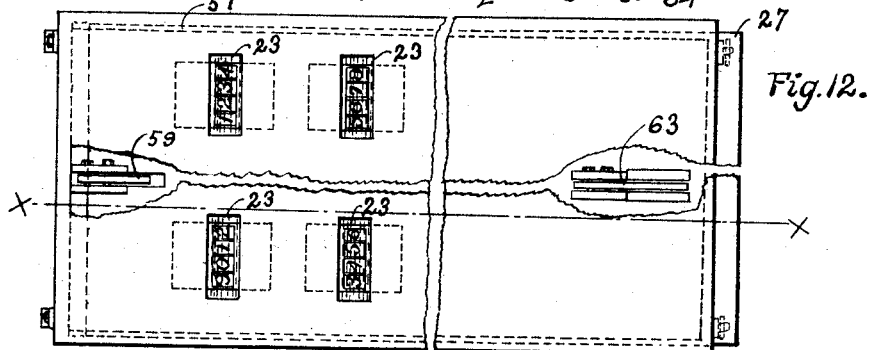
Fig. 12.
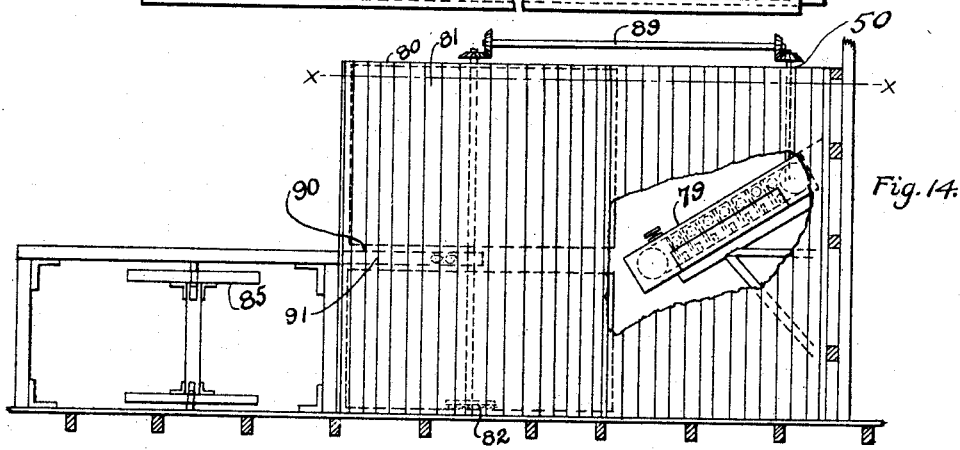
Fig. 14.
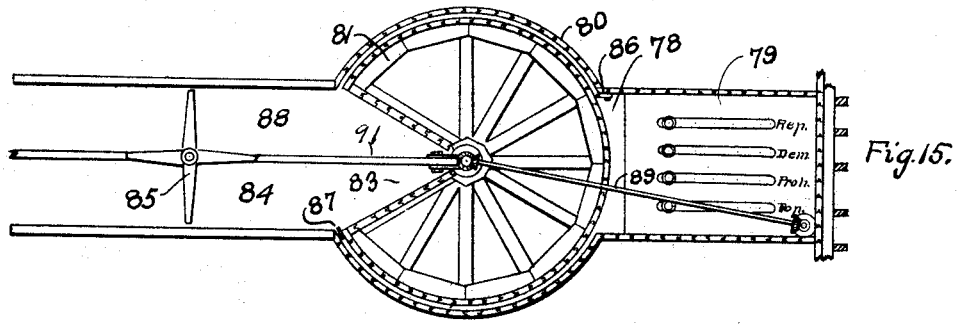
Fig. 15.
Fig. 16.
Witnesses
W. Pierce Cowles
M. E. Gooley
Inventor:
James H. Dean.
By Paul O. Hawley
his attorneys.

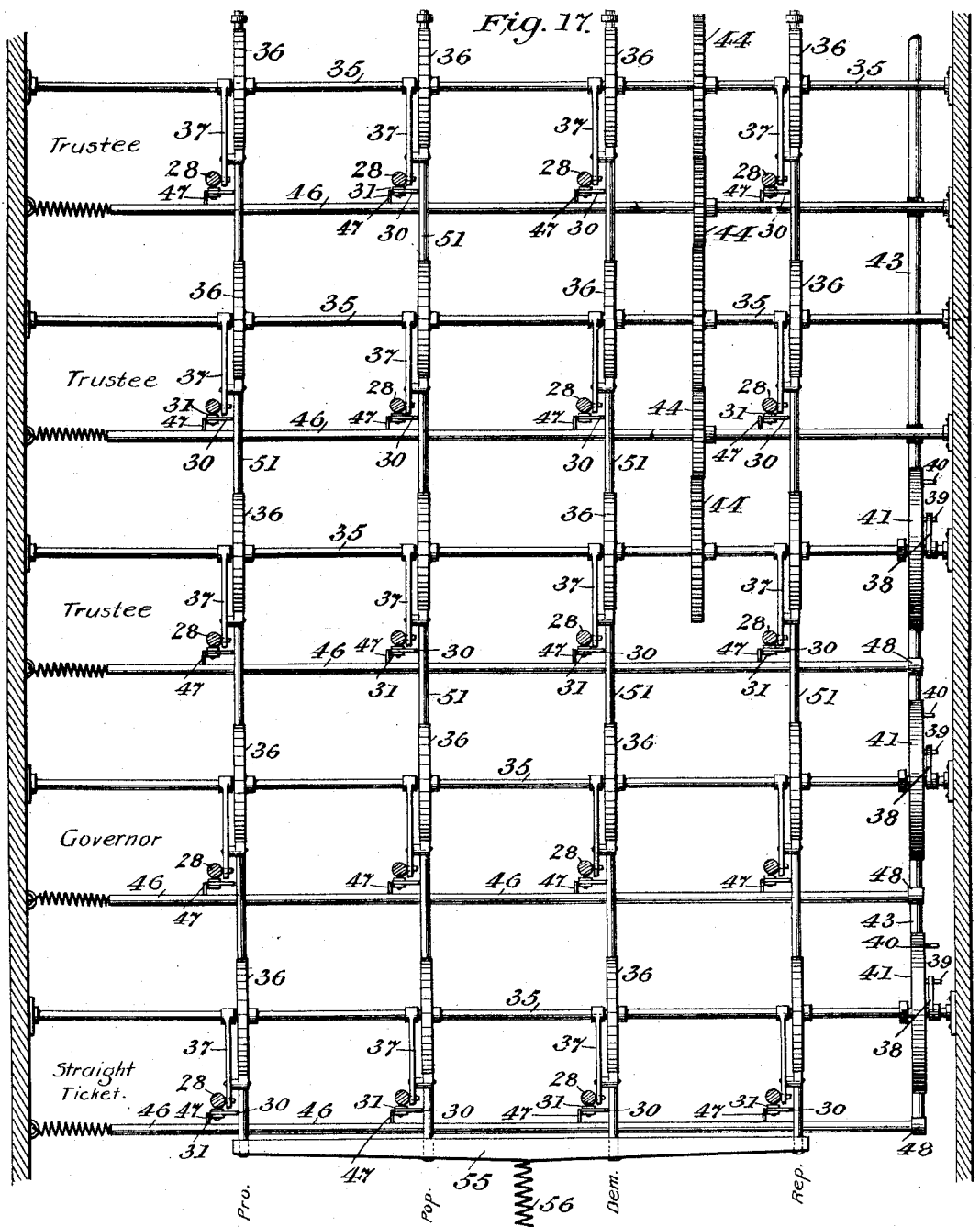

No. 622,191. Patented Mar. 28, 1899.
J. H. DEAN.
VOTING MACHINE.
(Application filed May 17, 1897.)
(No Model.) 8 Sheets—Sheet 7.
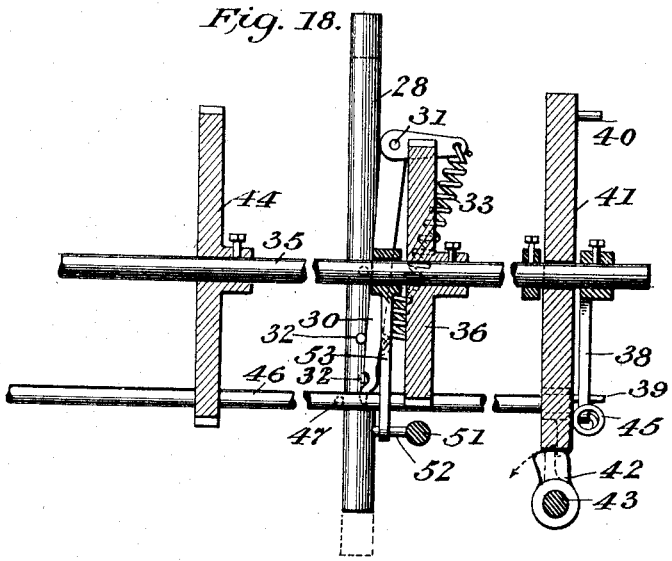
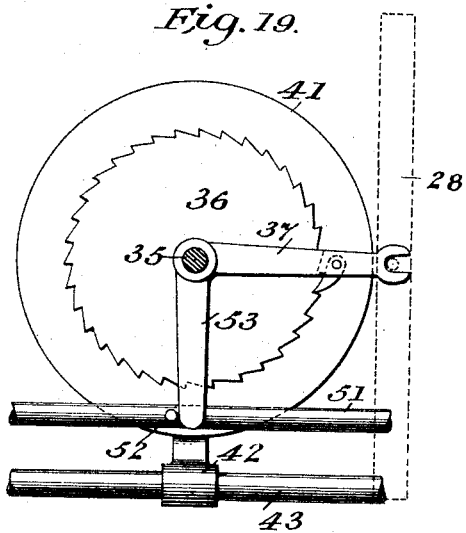
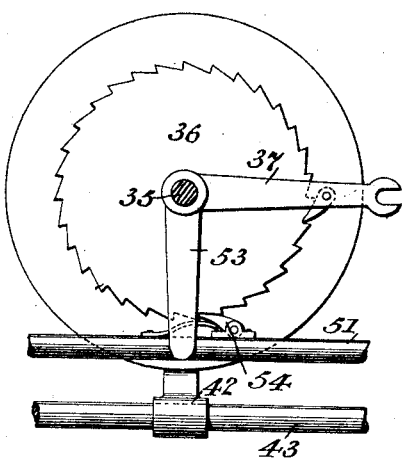
Witnesses.
Chas. H. Baker,
R. A. Balderson,
Inventor
James H. Dean
By Paul O. Hawley
his Attorneys.

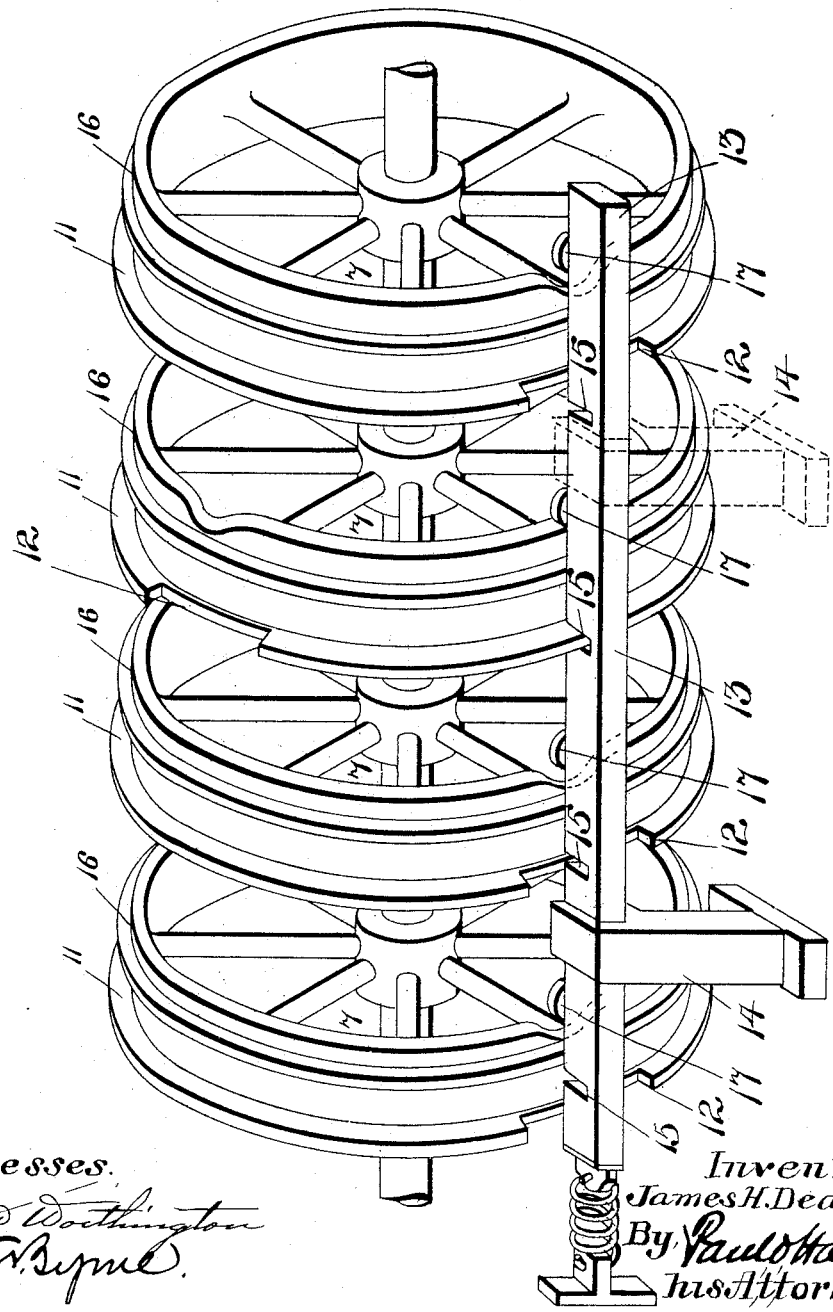

UNITED STATES PATENT OFFICE.

JAMES H. DEAN, OF ST. PAUL, MINNESOTA, ASSIGNOR TO ROSCOE F. HERSEY AND GEO. R. FINCH, OF SAME PLACE.

VOTING-MACHINE.

SPECIFICATION forming part of Letters Patent No. 622,191, dated March 28, 1899.

Application filed May 17, 1897. Serial No. 636,838. (No model.)

*To all whom it may concern:*

Be it known that I, JAMES H. DEAN, of the city of St. Paul, county of Ramsey, State of Minnesota, have invented certain new and useful Improvements in Voting-Machines, of which the following is a specification.

My invention relates to voting or ballot machines by which an accurate count or register may be made of all votes cast at an election without the use of the usual printed tickets or ballots.

The object of the invention is to provide a voting-machine which will occupy a small space, which will be automatic in its action, and which will be of a simple construction and of low cost.

Further and particular objects of the invention are to avoid the use of the bewildering number of keys found in the present voting-machines; to prevent the operation of more than one ticket or vote casting mechanism at a time—that is, to prevent the simultaneous use of two vote-casting mechanisms in any row or series thereof, whether representing a political ticket or opposite candidates upon different tickets; further, to positively and absolutely prevent the casting of more than a given number of ballots, which the voter is allowed to select or determine upon, for a certain number out of a larger group of candidates or devices representing such candidates; further, to provide positive and absolute means for clearing the machine and resetting and returning the parts thereof in readiness for the next voter; to eliminate reciprocating parts and substitute reliable rotating parts therefor wherever possible; to provide means which will absolutely prevent false or dishonest manipulation of the counters or registers belonging to the machine by locking the same against operation after or at the time or even before the exposure of the counters to view and also locking the other parts of the machine against operation when an attempt is made to actuate the counters thereby after the counters have been viewed; and a further object of my invention is to provide a voting-machine capable of being readily adapted to any combination of offices to be filled, and whereby the machine by changes in one set of mechanisms only may be altered to suit a modified election-list.

A further object of the invention is to provide means whereby access to the machine is allowed to but one person at a time and whereby the means, preferably a booth, containing the machine is employed in certain operations of the machine necessary to unlock and reset the parts thereof when a voter has completed his ballot and before another voter is permitted to view the machine.

The invention consists generally in a voting-machine of the construction and combination of parts, all as hereinafter described, and particularly pointed out in the claims.

The invention will be more readily understood by reference to the accompanying drawings, forming part of this specification, and in which—

Figures 2, 3:
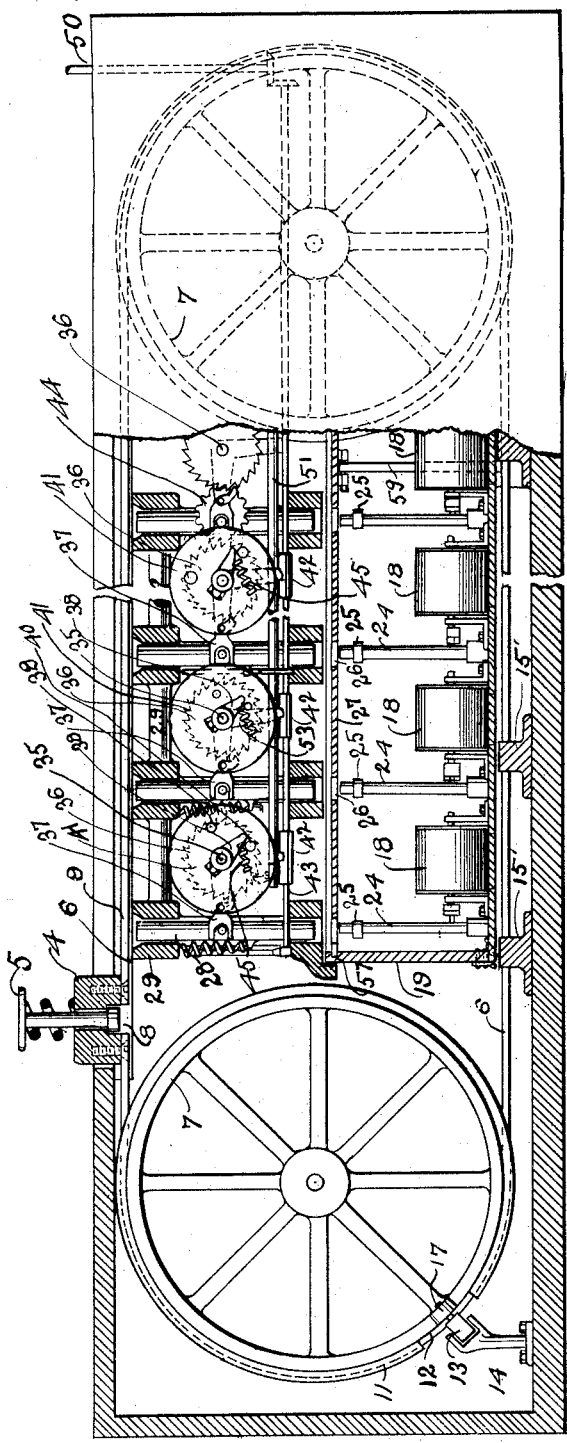
Figure 4:
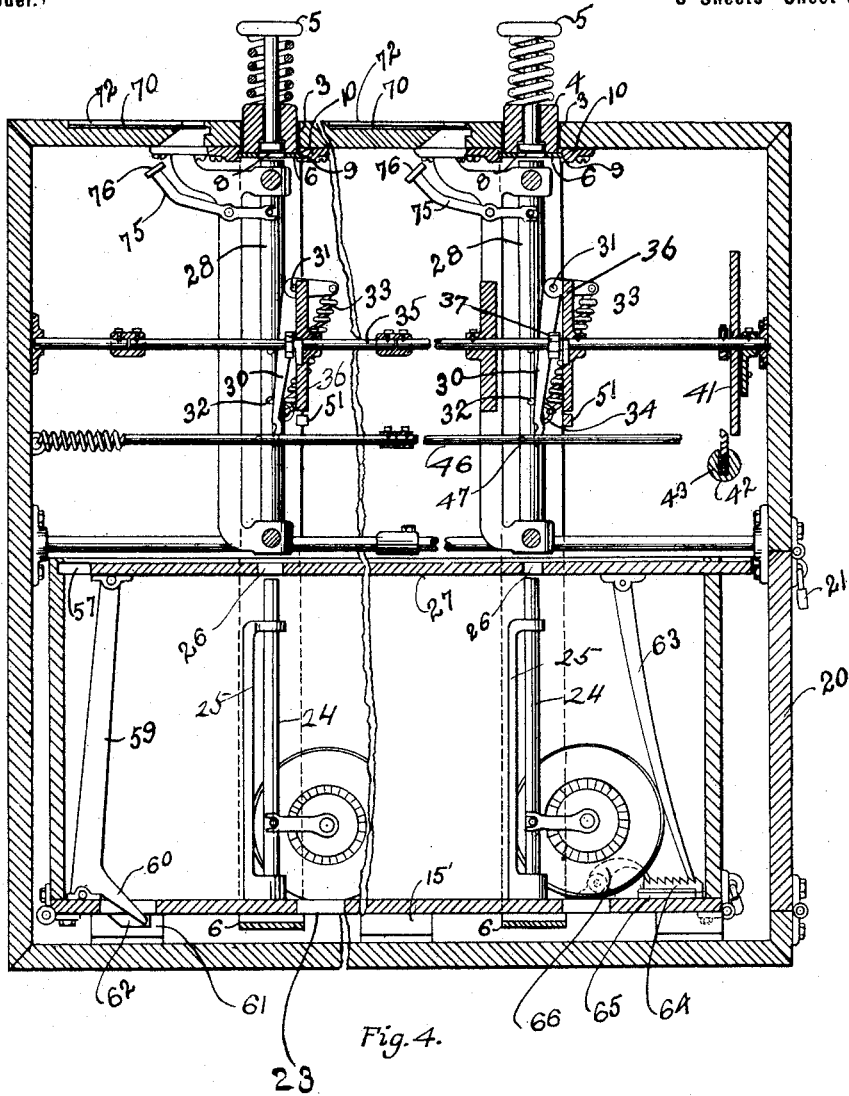

Figure 1 is a perspective view showing the voting-machine in the booth. Fig. 2 is a longitudinal section of the machine. Fig. 3 is a plan view thereof with the top removed. Fig. 4 is an enlarged cross-section of the machine. Fig. 5 is a skeleton view showing the manner of connecting the straight-ticket mechanism with the others and also showing the manner of coupling several tiers of mechanisms. Fig. 6 is a plan view of the same. Fig. 7 is a vertical view showing the mechanism as seen from the line $y\ y$ of Fig. 6 and viewed in the direction of the arrow. Fig. 8 is a sectional detail of the binder or dog which secures the limiting-stop disk. Fig. 9 is a detail view of the indicator or annunciator. Fig. 10 shows the lock used in connection with the belt-wheels. Fig. 11 is a detail of the notch in one of the belt-wheels. Fig. 12 is a plan view of the box or drawer which contains the counters. Fig. 13 is a sectional view thereof on the line $x\ x$ of Fig. 12. Fig. 14 is a side elevation of the booth. Fig. 15 is a plan section thereof on the line $x\ x$ of Fig. 14. Fig. 16 shows the ratchet which prevents the backward rotation of the door. Fig. 17 is a horizontal view showing the straight-ticket mechanism. Fig. 18 is an enlarged vertical section illustrating the limiting mechanism. Fig. 19 is a side elevation of an individual-candidate actuator. Fig. 20 is a similar view of a straight-ticket actuator. Fig. 21 is a perspective view of the interlocking mechanism employed between the belt-wheels and taken from Figs. 2, 3, 10, and 11.

As shown in the drawings, I preferably inclose the working parts of the machine in a frame, box, or casing 2. This box or frame is preferably provided with a slot 3 for each political party generally represented in an election. Guides of any sort may be substituted for these slots. In each of the slots there is a block or small frame 4, containing a key 5, whereby the devices within the frame or casing are adapted to be operated. Various forms of keys or buttons for operating the mechanisms may be employed; but I prefer to use a key or button of the simple push type, like those shown in the drawings. The slots or ways 5 are closed by bands, plates, or covers, with which, preferably, the blocks and push-keys are arranged to move. I prefer to provide endless bands or belts 6 as means to close the slots or ways, and thereby protect, cover, and lock the devices within the casing, so that the same may be operated by the keys or buttons 5 only. The bands or belts 6 are arranged upon belt-wheels 7, preferably within the box, in opposite ends thereof, and each belt is provided with a hole 8, through which the key or button may work. These belts are preferably of steel or like metal which cannot be readily injured, and they run in grooves 9, provided in the guides 10 in the sides of or beneath the slots proper 3, which slots are practically defined by said grooves. Owing to this arrangement of the belts they cannot be pressed inwardly and therefore effectually prevent the operation of the vote-casting mechanisms except by said keys or buttons. The belts and the buttons have determined normal positions preferably at the lower ends of the slots, and to prevent the movement of more than one belt, and hence the operation of more than one operating-key, at a time I arrange an interlocking mechanism between the several belts, whereby one only thereof may be used at a time. The belts are tightly stretched upon their wheels to prevent slippage between the same.

The interlocking mechanism may be in various forms; but I prefer to arrange the same to act upon the lower belt-wheels, and as the belts are held firmly upon said wheels the belts will be locked. For this purpose each belt-wheel preferably has a flange 11, provided with a notch 12, which latter, when the button is in its normal position, will permit the movement of a suitable locking device, which, lying within the notch, engages with the flange 11 and therefore prevents the rotation of the wheel. The locking device is preferably a transversely-movable bar 13, having suitable slide-bearings 14, and this bar, as shown in Figs. 10 and 20, has notches 15, one for each belt-wheel, separated from one another by distances either greater or less than the distances between the flanges of the several belt-wheels. When the bar is moved so that a notch therein will register with a flange upon a belt-wheel, said wheel may be rotated and its belt moved to position the operating-key opposite any desired device within the casing. I prefer that the operation of the locking device should be automatic, and to accomplish the different degrees of movement of the bar which are required to register the notches belonging to the different wheels with the flanges thereof I provide the wheels or equivalent parts with cams, preferably the cams 16, which vary in depth or width and which engage with lugs or rollers 17 on the bar 13. The notches 12 in the wheel-flanges are of greater length than the width of the bar, so that the wheel is permitted a slight rotary movement without regard to the bar. This rotary or initial movement of the wheel, and hence of the belt and the push-key, is employed to operate the cam upon the wheel against the locking-bar, and the dimensions of the parts are such that the notches in the opposite parts will thus automatically be caused to register and liberate the wheel to which such initial movement is imparted. As the wheel is rotated its flange passes into the notch or recess in the locking-bar, and said bar is thus in turn locked against operation and positively locks the other belt-wheels and belts. When the belt which has been freed is returned to its normal position, then and then only may another of the wheels be freed. As stated, the belts are preferably arranged one for each ticket; but the same may be made to operate across the tickets, each being made to cover and lock the devices in several tickets. Regardless of the particular arrangement of the belts with respect to the tickets it will be evident from the foregoing, as but one belt may be moved at a time and as said belt carries only one operating device or key, that a voter will be permitted to cast but one vote at a time—that is, it will be impossible for him to operate any two or more voting mechanisms simultaneously. In this manner one of the most difficult problems in voting-machines is successfully solved. I prefer to provide the upper belt-wheels with flanges to keep the belts in line on the return sides thereof.

The "counter or registering mechanisms," which expression I desire to have understood as including and defining any sort of record or registering means, are arranged within the casing or box and in rows or series beneath or adjacent to the covers, locks, or belts. The counter devices proper, 18, are preferably arranged in the lower or back part of the casing, and as a voting-machine constructed in accordance with the drawings herewith or in accordance with any of the plans heretofore advanced is of considerable weight and is difficult to move from place to place I prefer to arrange the counter devices proper so that they may be removed from the other parts of the machine and carried, if desired, to the office of the city clerk or other official or board having charge of the final count. I therefore preferably arrange the counters or registers 18 in the box or frame 19, which during voting is stationary within the casing, but after the polls are closed may be drawn out of the casing. The casing is provided with a door 20, preferably hinged and provided with a padlock 21, the key to which padlock is placed in the possession of the election judge or judges. When the drawer is in the casing or box, the counters are entirely concealed and the figures upon the counters remain unknown until the polls close. The figures upon the counters may show through openings through the bottom of the drawer or through holes 23 therein, and tickets or cards with the names of the candidates are preferably placed opposite the counters.

Any suitable counter, register, or record device may be employed, and each of the same is provided with an operating stem or part 24, preferably slidable in suitable guides 25 and upon the movement of which the counter is actuated. These stems preferably stand upright in the drawer. The drawer is provided with a slide or cover 27, preferably a simple plate provided with holes 26, through which the counter stems or parts are reached when the cover is in one of its positions. The operation of shutting off or cutting out the registers to prevent illegal operation thereof will be described hereinafter.

Between the counters and the belts I arrange the counter-actuating parts and the mechanisms which control or limit the movements thereof. The actuators are preferably simple plungers 28, the lower ends of which register with or stand opposite to corresponding counter-stems and are adapted to operate through the holes in the cover of the drawer. The plungers are held in a suitable framework 29 and are adapted to be operated by the keys or buttons of the belts. When a plunger or actuator is once depressed or operated, it is caught and held by suitable means, preferably a pawl 30, pivoted at 31 to the frame and engaging a pin or lug 32 on the plunger. This pawl is preferably made in the form of a bell-crank pivoted on the frame, and a spring connected with one arm of this crank or lever and to the plunger at a point 23 performs the double office of swinging the pawl into place and of returning the plunger or actuator to its outer position when liberated. By the locking down of the plunger when operated the voter is prevented from registering more than one vote for the candidate represented thereby. To prevent a voter from nullifying his vote by casting a second vote for two candidates for the same office, I provide a shaft 35 parallel with the transverse row of plungers and counters which represent candidates for the same office but on different tickets, and this shaft is arranged to be positively operated in one direction by any plunger, preferably through the medium of a simple ratchet-wheel 36 on the shaft and a pawl-carrying arm 37. The pawl on the arm 37 engages the ratchet-wheel, so that when the arm is operated by the depression of a plunger the ratchet-wheel and the shaft will be partially rotated. Obviously the operation of the ratchet-wheel belonging to any plunger or vote-casting mechanism will rotate the ratchet-wheels belonging to the other devices. The arrangement of the ratchets and the pawls permits the rotation of the ratchet-wheels and also the shaft in one direction only, and if the shaft or the ratchet-wheels are held against rotation obviously the plungers will also be held against movement, owing to the connection thereof with the pawl-carrying arms. To limit the number of votes which may be cast for candidates for the same office, it is therefore only necessary to limit the number of impulses or partial revolutions which the shaft and the ratchets are capable of receiving. Various mechanisms may be employed for this purpose; but I prefer to use a rotary mechanism and, further, one which operates always in one direction, whereby the accurate and reliable movement thereof may be easily provided for. Such devices I term "limiting" or "stop" devices, and the same positively lock the plungers against operation after a given number of votes have been cast.

The rotary device referred to preferably comprises an arm and a disk, either one being arranged upon the shaft and the other being freely revoluble with respect thereto. I prefer, as shown in the drawings, to fix the arm 38 upon the end of the tier-shaft or ratchet-shaft 35, while the disk is adapted to rotate about the shaft or concentrically therewith. The disk is provided with stops 39 and 40, between which the arm is movable, starting at one and being stopped by the other. The disk is held or locked by suitable means to prevent further movement of the arm when it has reached the farther stop-pin. In most cases but one candidate may be selected and voted for out of a group of candidates for a single office, and the tier or row of devices belonging to such a group of candidates has its stop-pins 39 and 40 so arranged that the arm and shaft are limited to one impulse or partial rotation by one plunger and are then locked to prevent the actuation of other plungers. The plungers, ratchets, and the locking or limiting devices are the same throughout the machine, with the exception that the distances between the stops on the disks vary according to the number of votes allowed for each group of candidates. When two or more tiers or transverse rows of devices are required to represent a large group of candidates for the same office—such as a board, commissioner, or electoral college—I preferably provide but one stop or limiting mechanism in connection with the several tiers. In such a case the shafts 35 of the different tiers are positively connected by means of gear-wheels 44 44 or equivalent means, so that a stop or movement forward upon either of the shafts or by either of the ratchet-wheels will move all of the others forward a step. In this case the stops 39 and 40 upon the limiting-disk are separated by a distance proportional to or steps equaling the number of selective votes which are allowed a voter. The disk and the stop arm are arranged upon either one of the shafts which are connected by the gear-wheels, and I am thus enabled by a most simple mechanism to effectually prevent the casting of more than the allowed number of votes, while at the same time the voter is permitted, if he desires, to vote for two candidates upon one ticket and select the remainder of his ballot from the other tickets, or he may vote the straight ticket—that is, fill the office by candidates upon one ticket or make any other combination of the allowed number from the several political tickets or rows of devices representing the same. Meantime, of course, as before explained, the voter is prevented from casting two votes for the same candidate or voting for more than one candidate at a time.

In order that the different combinations of tiers may be made quickly and readily, I preferably attach the gear-wheel 44' permanently to each shaft, so that an idler-gear 44 may be placed between any two adjacent gear-wheels, and thus connect the shafts. The stops upon the disks are preferably permanent and unchangeable, and to change the combinations the old disks are taken off and new ones with fixed stops take the places thereof.

It is especially necessary in voting-machines to provide means for accurately and positively returning and resetting all parts of the mechanism after a voter has completed his ballot. The liberation of the plungers or actuators is a simple matter, as will hereinafter be explained, the greatest difficulty being encountered in connection with the limiting devices, and I find it preferable to employ only such limiting devices as are capable of continuous rotation in one direction, accuracy being best obtained by rotary movements. The stop mechanism above described is particularly adapted to accurate operation. The stop-disks are required to be locked to limit the movement of the shaft-arm; but as the shafts 35 are preferably capable of rotation in but one direction it is necessary to provide means for shifting the stops 39 and 40 in a forward direction while retaining their relations to the stop-arm. Hence the disk or other part which carries the stop or stops is made revoluble, but is held from so doing except when the various parts of the machine are released and returned by the voter in passing through the swinging door of the booth or by a lever in the hands of the election judge. The disks may be positively actuated; but I prefer to connect the same with the arm by means of a light spring 45, so that when the disk is released the same will be caused to rotate toward or follow the arm upon the shaft, being stopped by the engagement of the first stop-pin 39 with such arm. Any convenient means may be employed to lock the disks during the voting operations, and a convenient lock and one which permits every possible variation necessary in the movement of the various disks is shown in Figs. 2 and 4 and comprises a spring cam or binder 42 for each disk, all being arranged upon a shaft or shafts 43 capable of being rotated after a voter has completed his ballot. When the shaft 43 is rotated, the cam will yield and spring past the disk 41, but at other times will bind so firmly against the disk as to lock the latter against rotation even when subjected to heavy pressure. A ratchet-disk and pawl may be used instead, if desired. It will be evident from the foregoing that when the disks are released by the operation of the booth-door, judges' lever, or other means the disks will automatically rotate and follow the arms, being thereby reset in position to allow a repetition of the selective voting. To release the plungers after a voter has completed his ballot, I preferably provide a series of spring cross-rods 46, having pins 47 to engage with the lower ends of the pawls 30 and move the same away from the pins or lugs upon the plungers or actuators 28. These rods are preferably moved in one direction by springs, and for positively operating the same I preferably connect them or provide each with a lug 48, as shown in Fig. 7, to be engaged by an arm or arms 49, provided on the shaft 43, which also carries binder-cams 42. Therefore upon the rotation of said shaft the plungers which have been depressed will be instantly released. If desired, the push-buttons upon the face of the machine may all be returned to the lower ends of the guides or slots 3 by means of suitable friction disks or clutches interposed between the belt-wheels and the mechanism by which the shaft 43 is rotated. I prefer, however, to rely upon the weights of the buttons to return the same by gravity.

To enable a voter to cast a straight ticket or ballot—that is, to vote for all of the candidates upon a ticket by one operation—I preferably provide straight-ticket-voting mechanisms, preferably devoting the first tier of mechanisms in the machine to the register of the number of straight votes cast for whole tickets. In this case the number of straight-ticket votes registered or recorded will be added to the specific vote for each candidate upon the same ticket at the time the election returns are made up. If straight-ticket voting is to be allowed, it is necessary to prevent further voting for individual candidates upon the same ticket. I therefore provide a longitudinally-movable rod 51 for each ticket or row of devices, said rod having pins 52, adapted to engage with arms 53, which, with the pawl-carrying arms 37 before referred to, form bell-cranks movable with the plungers or actuators 28. By reference to the drawings it will be noted that the arms 37 and 53 form a bell-crank lever, said arms being rigid with respect to one another and together are free to rotate on and are independent of the shaft 35. The disk 41 is likewise mounted free to rotate on and is independent of the shaft; but the serrated disk 36 and the arm 38 must be both keyed to the shaft and rotate with it. As soon as the rod 51 is held in the position shown in Fig. 5, with the pins thereon immediately back of the arms 53, the plungers connected with said arms will be locked against operation. The rod 51 is preferably held by a pawl 54, secured thereto and which engages with the ratchet-wheel 36 upon the shaft 35 of the straight-ticket or lowest tier. This ratchet is operated by pushing down the plunger, as in cases before explained, and its movement is limited to one step by suitable means—i. e., the disk 41—and as the ratchet moves over the pawl 54 the pawl is caught and held thereby against backward movement, so that the rod 51 and the bell-crank arms are all locked to prevent further voting. On the other hand, it is important that all of the straight-ticket-counting mechanisms shall be cut out or locked the moment any individual candidate is voted for upon any of the tickets. To this end I couple the bars 51 belonging to the different tickets in a frame, comprising said bars 51 and a cross bar or bars 55, so that when one bar is moved the others will also be moved. A booth-spring 56 may be employed to normally hold the bars 51 backward toward the straight-ticket devices; but when an individual-counting device is operated the bell-crank arm 53 thereof will engage the lug upon the opposite bar 51 and will force said bar 51 and all of said bars 51 forward, thereby, through the medium of the pawl 54 upon each bar 51, rotating the ratchet-shaft opposite the straight-ticket counters to the limit of the stop-arm movement, thereby positively locking all of the straight-ticket counters.

To prevent dishonest or ignorant manipulation of the counters of a voting-machine after the polls have closed or at any time by the judges or bystanders, it is necessary to first conceal or lock the counters from view and also to provide means whereby when an attempt is made to view the counters the same will then and thereafter be locked against further operation. Further, the arrangement should be such that the other parts of the voting mechanism would also be locked. These results may be obtained in various ways; but I prefer to so construct the drawer mechanism that the locking-out mechanism may form a part thereof, it being necessary to positively lock the counters before the drawer can be removed from the machine to permit the inspection of the counters, and, further, the counters remain locked even after the drawer is put back into place, so that the possibility of voting ceases the moment the counters are exposed. The means for locking the counters and other parts of the mechanism will be best understood by reference to Figs. 4, 12, and 13. As therein shown, the drawer cover or top 27 is preferably arranged to slide in grooves 57 in the drawer, and the drawer is preferably adapted to slide upon suitable guides 15′. (Marked 15 in Figs. 2 and 4.) I preferably employ the lever 59 to lock the drawer in the casing of the machine, said lever 59 being provided with an arm 60, extending through the bottom of the drawer and adapted to engage the fixed block 61 when the drawer is pushed in. When the drawer is first put into the casing, the cover thereof is preferably pushed back, so that the arm 60 does not strike the block 61; but as the lever 59 is pivoted upon the drawer-cover it is obvious that if the cover were in the drawn-out position it would be thrown back by the engagement of the arm with said block 61 when the drawer is put into the machine. The drawer is locked in the machine, therefore, by pulling out the cover and throwing the arm down into the notch 62 in the block 61. In the drawn-out position of the cover the holes therein will register with the counter-stems within the drawer and voting may proceed. Thereafter the drawer cannot be removed until the cover is thrown back again to lift the arm 60 out of engagement with the block 61, and this movement of the drawer-cover is made to lock the same, so that it cannot be drawn out. The locking means comprises the pawl 63, depending from the cover 27 and adapted to engage a ratchet-bar 64, arranged within the drawer. This ratchet-bar 64 is arranged to slide in a guide 65, and 66 is another pawl, also engaging with the ratchet 64. When the cover is first pushed in, either automatically or by hand, the pawl 63 engages with the bar 64, and said bar having previously been shifted to its rearward position by an authorized person is locked in said rearward position. When the cover is next drawn out, the bar 64 is moved forward by the pawl 63 and is caught and held in such position by the fixed pawl 66 within the drawer. Then when the cover 27 is finally pushed back, as on taking the drawer from the machine, the pawl 63 will trail back upon the rack-bar 64, and said bar being then locked in its forward position and incapable of further forward movement will in turn lock said pawl 63 and the drawer-cover, which latter is therefore prevented from again being drawn forward to permit further actuation of the counters. The drawer is provided with a door or side, the lock for which may be operated only by the city clerk or court official, and hence after the drawer has been once drawn out to inspect the counters or for any other reason said counters will be locked against further use, and the whole machine will be rendered inoperative to record further votes. A similar locking arrangement may be made in connection with the hinged door 20 or with a hinged or movable part upon the bottom or back of the machine box or casing, so that the counters cannot be viewed to ascertain the results of the election at any time without locking the machine against further use. Ballot-box stuffing or illegal manipulation is thus effectually prevented.

Considerable space is left between the belts upon the face of the machine, and these spaces contain glass covers 72, beneath which are placed the cards or slips bearing the names of the candidates. There is a hole 71 opposite each name-plate or card, and these holes are closed by the glass plates 72. The holes or openings are for the annunciators, which show the voter that he has struck a certain counter. These annunciators preferably comprise simple levers 75, provided with heads or plates 76, which as the lever is raised by the downward movement of the plunger or the movement of the pawl 30 show in the openings 71 opposite the names of the candidates voted for. As the plungers are locked when depressed the annunciators remain in sight until a voter has completed his ballot.

With a machine of this class it is desirable to remove the same entirely from any sort of manipulation by the election judges or clerks, and I therefore arrange the machine in a booth, which booth has an operating or moving part, the movement of which is communicated to the machine to reset the same. The booth which I prefer to employ in connection with my voting apparatus is shown in Figs. 14 and 15. It comprises the booth proper, 78, containing the machine, which is indicated in these figures by the numeral 79. To the booth is joined a circular or cylindrical extension 80, containing a cylinder-door 81, adapted to rotate in one direction only, owing to the use of a ratchet device 82. (See Fig. 16.) The cylindrical door is provided with an open sector or V-shaped space 83, into which the voter passes from the alley 84, having first to pass, preferably, a turnstile 85. The voter turns the door until the V-shaped space is opposite the machine, and he remains standing therein until he has finished voting. Meantime the door is automatically locked, preferably by the hook 86 upon the wall of the booth, which engages the pin 87 upon the revolving door. Another person is thus prevented from entering the booth while the voter is casting his ballot. When the voter has completed his ballot, he lifts the latch 86 and pushes the door around to its original position and passes out through the alley 88. The releasing-shaft 50 is rotated by a shaft-and-gear connection 89 with the shaft of the rotating door.

To prevent a voter from passing around within the door a second time, I make the cylinder in upper and lower parts with a space 90 between them and extend the middle bar 91, which divides the two alleys, to a fastening upon the shaft of the door, thereby continuing the alleys to the center of the cylindrical door.

As indicated, the construction of the machine is such that it may be readily built in sections and may therefore be cut down or enlarged to suit the requirements of any election. It is obvious that my invention admits of numerous modifications in construction, which modifications would at once appear to one skilled in the art, and I therefore do not confine my invention to the specific construction shown and described.

Having thus described my invention, I claim as new and desire to secure by Letters Patent—

1. In a voting-machine, the combination of a series of three or more counter devices with a single movable means covering, inclosing or concealing all but any one of said devices, whereby the operation of or upon more than one of said devices at a time is prevented, substantially as described.

2. In a voting-machine, the combination of a series or row of three or more counter devices together representing a single political ticket, with a single movable part preventing the operation of all but any one of said devices, substantially as described.

3. In a voting-machine, the combination of a series or row of counter devices, with a single part concealing, covering or inclosing said devices and thus preventing operation, and movable with respect thereto, said part having an opening through which one and one only of said devices may be reached or operated at a time, substantially as described.

4. In a voting-machine, the combination of a series or row of three or more counter devices with a single part, covering, inclosing or concealing said row of devices, and adapted to be operatively opened before any one and one only of said devices at a time, as and for the purpose specified.

5. In a voting-machine, the combination of a series of counter devices with a single part longitudinally movable before or opposite said row of devices, and adapted to permit the operation of or upon one and one only of said devices at a time and an operating part, substantially as described.

6. In a voting-machine, the combination with a series or row of counter devices of an endless device preventing the operation of all but any one of said counter devices, and permitting the operation of any one thereof, substantially as described.

7. In a voting-machine, the combination of a series or row of counter devices with a belt movable before or opposite said row and provided with a single opening or space through which one and one only of said devices may be reached at a time, substantially as described.

8. In a voting-machine, the combination of vote-registering means for the several candidates upon the different political tickets arranged in different rows with interlocking mechanisms preventing the registry of more than one vote at a time, substantially as described.

9. In a voting-machine, the combination with vote-register means, of a series of movable belts having single openings only for the voting operations of a voter, and interlocking means employed in connection with said belts, limiting the use thereof, to a determined number thereof at a time, substantially as described.

10. In a voting-machine, the combination of a series or row of counter devices with a part to operate upon said devices and movable to position opposite any one thereof, and means moving with said part to cover, or prevent the operation of the remaining devices, substantially as described.

11. In a voting-machine, the combination of a series or row of counter devices representing a political party with a part longitudinally movable with respect to said row of counter devices, and whereby any one thereof may be operated upon to actuate a corresponding counter device, substantially as described.

12. In a voting-machine, the combination of a row of counter devices with a part held in proximity to said row of devices, and adapted to be moved opposite any one thereof, and means following or connected with said part to prevent the operation of said devices except by means of said part, substantially as described.

13. In a voting-machine, the combination of a row of counter devices, with a device longitudinally movable with respect to said row of devices and adapted to operate upon any thereof, a longitudinally-arranged guide or guides holding said part, and means preventing the use or operation of any of said devices except by said part, substantially as described.

14. In a voting-machine, the combination of a row or series of counter devices, with a part or key adapted to operate upon any of said devices, and a device movable by said part and preventing the operation, of or upon, said devices except by said movable part, substantially as described.

15. In a voting-machine, the combination of a row of counter devices, with an endless movable cover or protector for said row or series, and a single part or key to operate upon said devices, substantially as described.

16. In a voting-machine, the combination of a series or row of counter devices with a rotary cover or protector therefor, a single key or button movable with said cover or protector and by which alone said devices are operative, substantially as described.

17. In a voting-machine, the combination of a row or series of three or more counter devices, with a single oscillatory cover or protector, by which all of said devices except any one are secured against operation, substantially as described.

18. In a voting-machine, the combination of a series of counter devices with a part for operating upon said devices, and a belt movable with said part and covering or concealing said devices, substantially as described.

19. The combination, in a voting-machine, of a row of counter devices with a part or key adapted to be moved before any one of said devices, and means covering or securing said devices against operation except by said part or key, said means opening before and closing after said part to constantly protect said devices, substantially as described.

20. In a voting-machine, the combination with register means for each of the regularly-nominated candidates of two or more political parties, and arranged in rows of two or more for each of the different parties, of means covering or preventing the simultaneous operation of the register means in different rows and whereby a voter is prevented from casting more than one vote at a time, substantially as described.

21. In a voting-machine, the combination with a number of register devices arranged in distinct rows and together representing all of the candidates of different political parties, with means constantly covering or securing all but any one of said devices against operation, substantially as described.

22. In a voting-machine, the combination of two or more rows of counter devices with movable securing parts for said rows, a single operating part for each row, and interlocking means between or connecting the movable securing parts of all the rows and preventing the operation of more than a single operating part at a time, substantially as described.

23. In a voting-machine, the combination of two or more rows of counter devices with a locking mechanism for each row, and all operable at different times by a single voter, parts for operating said devices, and a mechanism arranged between or connecting the locking devices of the different rows, and adapted, upon the actuation of one locking device, to lock or prevent the operation of the other locking devices by the same voter until the first locking device has been restored to its normal position by said voter, substantially as described.

24. In a voting-machine, the combination of two or more rows or series of counter devices with a movable cover for each row, an operating part movable with each cover, and interlocking means provided in connection with said covers, preventing the movement of more than one thereof at a time, whereby a voter is prevented from operating devices in more than one row at a time, substantially as described.

25. In a voting-machine, the combination with two or more sets of counters, respectively constituting different political tickets, of locking mechanisms, which, when a voter attempts to operate any device of one ticket, the other tickets as a whole are locked against operation, substantially as described.

26. In a voting-machine, the combination with two or more sets of counters constituting different political tickets, of locking mechanisms, which, when a voter attempts to operate any device of one ticket, the other tickets as a whole are locked against operation, and means whereby upon the completion of a portion of the ballot upon one ticket the voter may complete his ballot upon any one or all of the other tickets, substantially as described.

27. In a voting-machine, the combination of two or more series or rows of counter devices, with a single operating device for each row, and whereby said counter devices are alone capable of operation, and means which upon the movement of one of said operating devices lock all of the others against operation, substantially as described.

28. In a voting-machine, the combination of two or more series or rows of counter devices with a single operating or setting device for each row, and whereby said counter devices are alone capable of being operated, means which upon the movement of one of said operating devices lock all of the others against operation, and means whereby said counter devices are locked against further operation after once having been operated or set, substantially as described.

29. In a voting-machine, the combination of two or more rows of counter devices representing different political tickets, with operating means and securing devices, which, during the operation of any device in one row secures against operation all of the other devices in said row, and secures against operation every other row as a whole, substantially as described.

30. In a voting-machine, the combination of a row of counter devices and the actuators therefor, with a movable cover protecting and concealing said actuators, and a part on or movable with said cover for operating said actuators, substantially as described.

31. In a voting-machine, the combination of two or more rows or series of counter devices with means movable to position opposite any device, and whereby any one thereof may be operated upon, and means whereby during the operation of one of said parts the other or others are secured against operation, substantially as described.

32. In a voting-machine, the combination of two or more rows of devices representing different tickets with an operating part for each row or ticket operable in succession upon the devices in respective rows, and means for locking all but one of said parts, whereby votes may be registered upon one ticket at a time, substantially as described.

33. In a voting-machine, the combination of two or more series of counter devices with an operating device for each of said series and movable opposite the devices therein, and locking means for said operating devices preventing the operation of more than one thereof at a time, substantially as described.

34. In a voting-machine, the combination of two or more rows or series of counter devices with an operating part for each of said rows or series, means for locking all but one of said movable parts, and means preventing the operation of said devices except by said parts, substantially as described.

35. In a voting-machine, the combination with a row of counter devices, of a single key or button longitudinally movable with respect to said row of devices and whereby and by which alone any one and one only of said devices may be operated at a time, substantially as described.

36. In a voting-machine, the combination of a row of counter devices with a single key or button longitudinally movable before said row and whereby any one of said devices may be operated, and means for preventing the operation of said devices except by said key or button, substantially as described.

37. In a voting-machine, the combination of two or more rows or series of counter devices with means whereby any one thereof may be operated upon, and means which during the operation of one of said counter devices secures or prevents the operation of all the other counter devices, substantially as described.

38. In a voting-machine, the combination of two or more rows or series of counter devices with a single operating part for each row or series, said operating parts having normal positions with respect to said rows, means upon the initial movement of one of said operating parts to lock the other operating parts, and means to prevent the operation of more than one counter device at a time, substantially as described.

39. In a voting-machine, the combination of two or more rows or series of counter devices with a single operating part for each row or series, said operating parts having normal positions with respect to said rows, means upon the initial movement of one of said operating parts to lock the other operating parts, means to prevent the operation of more than one counter device at a time, and a suitable mechanism preventing the operation of more than a given number of counter devices representing the same office upon different tickets, substantially as described.

40. In a voting-machine, the combination of two or more rows or series of counter devices, with an operating device for each row to operate the devices therein, means for locking all but one of said operating devices, and means whereby either of said operating devices may be liberated for use only after the return of all of the other operating devices, substantially as described.

41. In a voting-machine, the combination of a row or series of counter devices with a moving belt preventing the operation of more than any one of said devices at one time, and an operating part moving with said belt to engage said devices, substantially as described.

42. In a voting-machine, the combination of a series of counter devices with a suitable casing or frame therefor, having a guide or slot adjacent to said series of devices, and an operating part movable in or upon said guide or slot for operating upon any one of said series of devices, substantially as described.

43. In a voting-machine, the combination of a series or row of counter devices, with a suitable casing or frame therefor, a movable belt covering or protecting said row of devices, and a push button or key movable with said belt to operate upon said devices, one at a time, substantially as described.

44. In a voting-machine, the combination of two or more rows or series of counter devices, with a suitable casing or frame therefor, a movable device covering or protecting each series of counter or register devices, a part or key to operate upon said devices as permitted by said movable devices, and automatic means preventing the operation of more than one of said movable devices at a time, substantially as described.

45. In a voting-machine, the combination of two or more series of counter devices with a single operating part or button belonging to each row or series, and whereby the devices in said rows may be successively operated by the voter, and means to prevent the simultaneous operation of any two of, said buttons or keys, substantially as described.

46. In a voting-machine, the combination of two or more series of counters, each series constituting a ticket, with means permitting the operation of any counter by a voter but preventing the operation of the counters of more than one ticket at a time, and compelling the successive operation of counters selected by the voter, substantially as described.

47. In a voting-machine, the combination of a suitable frame or casing with two or more rows or series of counter devices, a belt for each row or series of counters, means moving with said belts for the operation of said devices, and means locking said belts but permitting either one thereof to be operated, substantially as described.

48. In a voting-machine, the combination of two or more rows or series of, individually-operable counter devices with means whereby any one of said devices may be operated, and means which during the operation of one of said devices prevent the operation of any other counter device, and means preventing the operation of more than a given number of counter devices one at a time, substantially as described.

49. In a voting-machine, the combination with two or more rows of counter devices, each said device representing a candidate, of an operator, means for each row preventing the operation of more than one device at a time in any row, and locking means arranged between or connecting the aforementioned means, for locking out all but any one of said rows during the operation by a voter of any counter device in such row, substantially as described.

50. In a voting-machine, the combination of two or more rows of counter devices with operating means, a cover for each row, and automatic means for locking all but any one of the covers, substantially as described.

51. In a voting-machine, the combination of rows of counter devices with a counter-securing mechanism for each row, transverse connecting means capable of operation by a voter to successively free said securing mechanisms one at a time and secure the others, substantially as described.

52. In a voting-machine, the combination of two or more rows or series of counter devices with operating parts movable before or opposite to said counters, an automatic lock for said operating parts, whereby the movement of one of said operating parts actuates said locking means to secure the other operating part or parts against operation, thereby preventing the voter from registering votes upon more than one row of devices at a time, substantially as described.

53. In a voting-machine, the combination with a suitable casing or frame, of two or more belts and guides therefor, an operating device movable with each belt, a series of counter devices concealed or protected by each belt, means locking said belts and operated by the initial movement of one belt to free the same and lock the other or others, substantially as described.

54. In a voting-machine, the combination of a suitable frame with one or more rows of counter or register devices provided therein, a movable operating device for successively operating the devices in each row of devices and preventing the operation thereof in any other way, and means whereby the initial movement of one operating device renders the other operating devices inoperative, substantially as described.

55. In a voting-machine, the combination of movable parts each having a key or button, with counter devices concealed or protected by said movable devices and to be operated upon by the said keys or buttons, means locking said movable parts and adapted to be actuated by the initial movement of either one thereof to liberate that one and lock the others until said part is returned to its original position, substantially as described.

56. In a voting-machine, the combination with one or more rows of counter devices, of belts covering said devices, keys or buttons therefor, and belt-locking means set by the initial movement of any belt to lock the other belts, substantially as described.

57. In a voting-machine, the combination of one or more belts movably held, with locking means engaging parts whereby said belts are movably held and whereby said belts are locked to prevent the operation of more than one belt at a time, and counter devices, substantially as described.

58. In a voting-machine, the combination of one or more rows of devices, with a single movable device for each row, said movable devices being successively operable by the same voter, and means preventing the simultaneous use of two or more of said movable devices, as and for the purpose specified.

59. In a voting-machine, the combination with a suitable casing or frame, provided with two or more slots, of a series of counters and counter-actuating devices arranged along each slot, and a device in each slot movable therein and whereby said counter-actuating devices are adapted to be operated, and means preventing the operation of the devices of more than one slot at a time, substantially as described.

60. In a voting-machine, the combination of the series of counter-actuating devices with means for securing the same to prevent repeating, and an operating device, a guide therefor, and said device adapted to be moved or placed opposite the individual counter-actuating devices, to operate the same, substantially as described.

61. The combination, with a suitable casing, of an endless belt, a slot in said casing closed by said belt, a button adapted to operate through said belt, and counter or registering devices provided within the casing to be operated by said button or key, substantially as described.

62. The combination, with a suitable casing or frame provided with two or more guides or slots, of movable parts for closing said slots, buttons or keys carried by said movable parts and whereby counter or registering devices within the casing are adapted to be operated, and means whereby only one of said movable parts may be operated at a time, substantially as described.

63. The combination, with a suitable casing provided with a slot, of a belt operating in guides to close said slot, a button or key carried by said belt, and counter-actuating devices arranged within the casing and below said belt in position to be operated by said button or key, substantially as described.

64. The combination, with a suitable casing, of a belt carrying an operating device, means for locking the belt to prevent movement thereof, automatic means for unlocking the same, and counter-actuating devices to be moved by said operating device, substantially as described.

65. The combination, with a suitable casing, of the belts, a series of counter devices provided beneath each belt, parts carried by the belts for operating said devices, and means for preventing the movement of more than one of said belts at a time, substantially as described.

66. The combination, with a suitable casing or frame, of the belt-wheels, the belts arranged thereon, counter devices to be actuated by parts carried by said belts, and a shifting bar adapted to lock all but one of said belt-wheels and belts at any given time, substantially as described.

67. The combination, with a suitable casing or frame, of two or more belts, the pulleys therefor, counter devices to be actuated by parts upon said belts, flanges upon said wheels, side flanges or cams thereon, a notched bar movable in notches provided in the flanges on said wheels, and said bar adapted to be moved different distances by the rotation of different wheels, substantially as described.

68. The combination, with a suitable casing provided with the slot, of a belt or plate movable in said slot to close the same, a push button or key carried by said belt or plate, and a series of depressible counter-actuating devices arranged beneath said belt to be operated by said push button or key, substantially as described.

69. The combination, in a voting-machine, of a suitable casing provided with slots, with belts to operate in said slots, belt-wheels carrying the said belts, counter-actuating and counter devices provided in said casing, and buttons provided upon said belts and whereby said devices are operated, said buttons being returned in the slots by the action of their weight upon the belts, substantially as described.

70. In a voting-machine, the combination with a plurality of belts and moving operating devices or keys, of means to prevent the use of more than one belt at a time, the rows of counter devices, and means to prevent the operation of two counter devices, which represent candidates for a single office, substantially as described.

71. In a voting-machine, the combination with a row of counter devices, of a single movable part concealing the same, a single movable part to operate upon said counter devices, and means to prevent more than one operation upon any one counter device, substantially as described.

72. In a voting-machine, the combination of two or more rows of devices, with a movable part for each row whereby the operation of the devices therein is limited to one at a time, counters operatively connected with said devices, and means whereby the devices in said rows are related or connected, and the relative operations thereof limited, substantially as described.

73. In a voting-machine, the combination of two or more rows of counter devices, with means to prevent the operation of more than one of said devices at a time, and mechanisms whereby the devices in said rows are related and the number of possible operations thereof is limited, substantially as described.

74. In a voting-machine, the combination of a multicandidate group of two or more rows of counter devices representing candidates in different political parties, with means whereby said devices are connected, limiting means in connection therewith whereby when the allowed number of devices have been operated, or votes cast, the devices which have remained unoperated are locked against operation, and means to prevent the operation of more than one of said devices at a time, whereby the accurate operation of said limiting means is insured, substantially as described.

75. In a voting-machine, the combination of a multicandidate group of two or more rows of counter devices representing candidates in different political parties, with means whereby said devices are connected, limiting means in connection therewith whereby when the allowed number of devices have been operated or votes cast the devices which have remained unoperated are locked against operation, means to prevent the operation of more than one of said devices at a time, whereby the accurate operation of said limiting means is insured, and means whereby more than one operation of any one device by the same voter is prevented, substantially as described.

76. In a voting-machine, the combination with rows of counter-operating devices and a counter for each operating device, representing candidates in different political parties, of means to prevent voting upon said devices for candidates in different political parties at the same time, and means to prevent voting for two candidates in the same political party at the same time by the operation of any two devices in the same row, substantially as described.

77. In a voting-machine, the combination of rows of counter devices representing candidates in different political parties, with means to prevent voting upon said devices for candidates in different political parties at the same time, means to prevent voting for two candidates in the same political party at the same time by the operation of any two devices in the same row, and means positively limiting the number of votes which may be cast for candidates for the same office, substantially as described.

78. In a voting-machine, the combination of rows of counter devices representing candidates in different political parties, with means to prevent voting upon said devices for candidates in different political parties at the same time, means to prevent voting for two candidates in the same political party at the same time by the operation of any two devices in the same row, said devices being divided into groups, each group comprising one or more devices from each of said rows, and means for each group connecting the devices therein and limiting the number which may be operated or selected therefrom, substantially as described.

79. In a voting-machine, the combination of two or more rows of devices, with a movable part covering or concealing each row of devices, operating keys or buttons moving with said movable parts, the counters or registers, and means forming an operative limiting or locking connection between said counters, whereby a given number only thereof may be operated by one voter, substantially as described.

80. In a voting-machine, the combination, with two or more rows of counter devices, representing the different tickets, of a single operating device for each row, belts protecting said counter devices, and a mechanism actuated upon the operation of the counter devices and limiting the number thereof that may be actuated by a voter, substantially as described.

81. In a voting-machine, the combination, with two or more rows of counter devices representing different tickets, of movable operating devices, and the movable belts protecting said rows of counter devices, and a mechanism actuated through the medium of said counter devices and limiting the number thereof which may be operated by a voter, substantially as described.

82. In a voting-machine, the combination of two or more series of counter-actuating devices, with counters or registers, a protecting-belt for each series of counter-actuating devices, an operating key or button carried by said belt for each series, means locking all but one belt against operation, and means to prevent the operation of more than a given number of counters by one voter, substantially as described.

83. In a voting-machine, the combination of a plurality of rows of counters and counter-actuators, with means to prevent the operation of more than one actuator at a time, rotary mechanisms operatively connecting corresponding actuators in the different rows, and rotatingly-operated limiting means in connection therewith, preventing the operation of more than a given number thereof by a single voter, substantially as described.

84. In a voting-machine, the combination of the belts and the keys or buttons thereon, with the rows of counter devices, means limiting the number of counter devices which may be operated by a single voter, and said belts being automatically returned when a voter has finished voting, substantially as described.

85. In a voting-machine, the combination of the rows of counter and counter-actuating devices, with means preventing the operation of more than one of said actuators at a time, and means movable in one direction only, operatively connecting the counter-actuating devices and preventing the operation of more than a given number thereof by one voter, substantially as described.

86. In a voting-machine, the combination of a series of tiers of devices, each tier having a counter for each political party, rotary means for positively connecting any of said tiers of devices, and independent limiting means common to all of the tiers which are so connected to limit the number of counters which may be operated in said tiers, substantially as described.

87. In a voting-machine, the combination of a row of counter devices and means for operating any one thereof at a time, with a limiting or locking mechanism capable of movement in one direction only and adapted to be operated by or with either of the said devices to limit the number of votes which may be cast, substantially as described.

88. In a voting-machine, the combination of two or more rows of counter devices, and means for operating the same, with a stop or limiting mechanism comprising a number of parts, one for each of said devices, movable therewith or thereby, and capable of movement in one direction only, means positively connecting the parts of said stop or limiting mechanism, and limiting means provided in connection with said mechanism, as and for the purpose specified.

89. In a voting-machine, the combination of two or more rows of counter devices, with a stop or limiting mechanism comprising a part for or connected with each device, and capable of movement in one direction only, means to prevent the operation of more than one of said counter devices at a time, and a rotary stop and clearing device common to all of the parts of said stop or limiting mechanism, substantially as described.

90. In a voting-machine, the combination with the frame of a belt movable therein, a voting key or button carried by said belt, the row of counter-actuating devices and counters, and means for locking said actuating devices against further operation after they have been once operated by a voter, substantially as described.

91. In a voting-machine, the combination of a series of counter devices and means for operating the same, with a shaft, means for rotating the same from said devices, and means movable independently of said shaft for limiting the rotary movement thereof, as and for the purpose specified.

92. In a voting-machine, the combination of the series of counter devices and means for operating the same, with a shaft, means for rotating the shaft from said devices, a device limiting the rotary movement of said shaft, and means for advancing the limiting device for resetting the same, substantially as described.

93. In a voting-machine, the combination of a series of devices representing a number of candidates for the same office, with a step-by-step stop or limiting mechanism adapted to be rotated by said devices, and limiting the number thereof that may be operated by a single voter, and means causing the further movement of said stop mechanism in the same direction to reset said stop mechanism and prepare the entire mechanism for further operation, substantially as described.

94. In a voting-machine, the combination of a series of devices representing candidates for the same office, with a rotary stop mechanism having a part to be advanced by the operation of said devices, and having another part normally stationary, and means to rotate said stationary part, in the same direction as the movable part of said stop mechanism, to set said normally stationary part and adapt said devices to further operation, substantially as described.

95. In a voting-machine, the combination of a series of counter devices representing candidates for the same office, with a stop mechanism determining the number of devices which may be operated by one voter, and comprising a part moved with said devices and a normally stationary part, the movable part being stopped by said normally stationary part, and means for rotating said normally stationary part to reset the stop device and adapt said counter-actuating devices and counters to operation by the next voter, substantially as described.

96. In a voting-machine, the combination of a series of counters and means for operating the same, with a rotating mechanism adapted to be operated always in the same direction, a stop mechanism comprising a movable part connected with said rotary mechanism, and a normally stationary part, with which stationary part said movable part of the stop mechanism engages after the operation of a given number of counters, and means for moving and resetting the normally stationary part of the stop mechanism, substantially as described.

97. In a voting-machine, the combination of two or more tiers of devices representing candidates for the same office, with a step-by-step stop mechanism adapted to be moved one step upon the operation of either of said devices, and a normally stationary portion of the stop mechanism wherewith said movable part engages after the operation of a given number of said devices, and means for shifting and resetting the normally stationary part of the stop mechanism, substantially as described.

98. In a voting-machine, the combination of two or more tiers of devices representing candidates for the same office and to be operated by a voter, with a rotary mechanism provided in connection with each of said tiers to be operated by the devices composing the same, means connecting the rotary devices of said tiers, and a single stop mechanism adapted to be moved one step by the operation of any device in either of said tiers, and a normally stationary part of said stop mechanism to limit the movement of the movable part thereof, and itself movable, to reset said stop mechanism, substantially as described.

99. In a voting-machine, the combination of two or more tiers of devices representing candidates for the same office, for selective operation by a voter, a rotary mechanism provided in connection with each of said tiers, to be operated by the devices composing the same, means connecting the rotary devices of said tiers, and a single stop mechanism adapted to be moved one step by the operation of a device in either of said tiers, and a normally stationary part of said stop mechanism to limit the movement of the movable part thereof, the parts of said stop mechanism being rotated in the same direction to reset the stop mechanism and make the machine operative by the next voter, substantially as described.

100. In a voting-machine, the combination of the counter devices with the stop or limiting mechanism permitting the operation of a given number only of said devices and comprising a normally stationary part and a rotary part, said rotary part adapted for actuation by said devices and having its movement limited by said stationary part, and means for moving said stationary part to reset the mechanism, substantially as described.

101. In a voting-machine, the combination of a multiple impulse stop device with a series of devices by any one of which a single impulse may be exerted upon said multiple impulse device, normally-fixed means limiting the travel of said multiple impulse device, and means for moving said normally-fixed means to permit further movement of said multiple device in the same direction by the next voter substantially as described.

102. In a voting-machine, the combination of a series of counter devices and means for operating the same, with a shaft, means preventing the movement of said shaft except in one direction, a part on said shaft opposite each of said devices and whereby said shaft is operated, and means limiting the rotary movement of said shaft and thereby limiting the number of said devices which may be operated by one voter, substantially as described.

103. In a voting-machine, the combination of a series of counter devices with a shaft movable in a forward direction by any of said devices and always held against backward movement by those devices that are not operated, and means limiting the forward movement of the shaft to a distance or degree commensurate or proportional to the number of votes allowed for the group of candidates represented by said devices, substantially as described.

104. The combination in a voting-machine of a series of counter-actuators, with a ratchet device, one for each actuator, for operation thereby and movable means common to all said devices to limit the movements of said devices to a certain number, substantially as described.

105. The combination, with two or more tiers or banks of counter-actuating devices, of a shaft arranged parallel with each bank or tier thereof, and provided with a ratchet-wheel for each one of said counter-actuating devices, means for connecting said ratchet-wheels with respective counter-actuating devices, and a stop device provided in connection with said shaft and whereby the movement thereof and hence of the counter-actuating devices, is limited, substantially as described.

106. The combination with counter-actuators of a movable device provided with stops, means for securing said movable device, before the operation of said actuators, and a device moved by the operation of said actuators and the movement of which is limited by the stops upon said movable device when said movable device is secured, substantially as described.

107. The combination with two or more counter devices of a part to be moved with either of said devices, and a stop or lock to limit the degree of movement of said part, and capable of movement in one direction only, substantially as described.

108. The combination with two or more counter-actuating devices of a part to be moved by the operation of either thereof, stops to limit the movement of said part, and said stops being movable to adapt said part to operation always in one direction, substantially as described.

109. The combination with two or more counter devices, of a shaft to be partially rotated by the movement of either one of said devices, an arm or part connected with the shaft, stops to limit the movement thereof, and said stops being adapted for concentric rotation with said arm or part and means for locking the stops and for advancing them when released, substantially as described.

110. The combination with two or more counter-actuating devices of a stop movable in one direction only for limiting the movement of all but a predetermined number of said actuating devices, and forwardly-movable rotary means for rendering said stop and dependent devices reoperative, substantially as described.

111. The combination, in a voting-machine, of two or more counter-actuating devices, with a shaft provided with ratchet-wheels and adapted to be partially rotated by the movement of either of said actuating devices, an arm provided upon said shaft, a disk to rotate about said shaft, stops upon said disk for said arm, and means for locking said disk, substantially as described.

112. The combination, in a voting-machine, of two or more counter-actuating devices, with an arm to be rotated by the movement of either of said devices, a disk, retractile means connecting said arm and disk, stops upon said disk to limit the movement of said arm, and means for locking said disk, substantially as described.

113. The combination in a voting-machine of two or more tiers of counter-actuating devices, with parts to be actuated by the operation of either of said devices, means positively joining and connecting said parts whereby they are made to move together, and a stop device in connection with one of said parts only for limiting the movement of all thereof and thereby limiting the number of actuating devices that may be operated, substantially as described.

114. The combination, with two or more tiers of counter-actuating devices, of a shaft for each tier means connecting each of the said shafts with each of the devices in respective tiers, whereby said shafts are partially rotated by the movement of said devices, means connecting said shafts whereby the movement of one will rotate the other, and a stop device connected with one of said shafts to limit the movement of all of the same, as and for the purpose specified.

115. The combination, with two or more tiers of counter-actuating devices, of shafts to be rotated thereby respectively, gears or like mechanisms connecting said shafts, and a traveling stop device operable in one direction only provided in connection with one of said shafts, substantially as described.

116. The combination, with two or more tiers of counter-actuating devices, of shafts to be rotated thereby respectively, means connecting said shafts, whereby they are made to rotate simultaneously, an arm provided upon one of said shafts, stops to limit the movement of said arm, and means for advancing said stops substantially as described.

117. The combination with two or more tiers of counter-actuating devices, of shafts to be rotated thereby, respectively, means connecting said shafts whereby they are made to rotate simultaneously, an arm provided upon one of said shafts, stops to limit the movement of said arm, a disk carrying said stops and adapted to rotate, means for locking said disk, and means connecting said arm and disk whereby upon the liberation of the disk, the disk will follow the arm, whereby the arm is permitted to rotate always in the same direction, substantially as described.

118. The combination in a voting-machine of a series of voting devices, with a step-by-step stop mechanism operable by any of said devices, comprising a movable part and a normally stationary part and means causing the movement or advance of said normally stationary part after the determined number of movements of said movable part, substantially as described.

119. The combination in a voting-machine of the counters and operating means with means concealing said counters and means compelling the locking or securing of said counters, as the same are exposed to view, substantially as described.

120. The combination, with a series of counter-actuating devices, of bell-cranks engaging the same, and a common rod having stops to engage the said bell-cranks, and means whereby one of said counter-actuating devices is held against operation after the operation of either of the others, substantially as described.

121. The combination, in a voting-machine, of a series of counter-actuating devices, one of the same provided with a ratchet-wheel, with a longitudinally-movable rod provided with a pawl to engage said ratchet-wheel, the other counter-actuating devices having bell-cranks, wherewith lugs upon said rod engage to prevent the operation thereof after the operation of the first device, substantially as described.

122. In a voting-machine, the combination of a series of counter devices, with levers operating therewith, and a common rod having lugs to engage said levers, and means whereby one of said devices is held against operation after the operation of either of the others, substantially as described.

123. In a voting-machine, the combination of a series of counter devices with a longitudinally-movable rod, one of said counter devices adapted upon operation to operate said rod and the other counter devices having levers wherewith said rod operates to lock against operation said other devices after the operation of said one device, substantially as described.

124. The combination in a voting-machine of a series of counters or registers, means for actuating the same, means for concealing said counters or registers, and means compelling the securing of said counters against operation after they have been once exposed to view, substantially as described.

125. The combination, in a voting-machine, of the body thereof with a drawer or slide provided therein, the counters or registers provided in the same, suitable means for operating said counters, and automatic means upon said drawer or slide securing said counters after the drawer has been moved out, substantially as described.

126. The combination, in a voting-machine, of a series of counters, with means for concealing the same from view, a series of counter-actuating devices, and automatically-operative means interposed between said counter-actuating devices and said counters to prevent the operation of the counters as they are opened to view, substantially as described.

127. The combination, with a suitable casing, of the counter-actuating devices provided therein, the counters, a drawer or slide containing the same, and a cover therefor, through which the counter-actuating devices normally act upon said counters, and means for moving said cover and locking the same, after said drawer or slide has once been drawn out, substantially as described.

128. The counter drawer or case for voting-machines, comprising the drawer proper, wherein the counters are arranged, the perforated cover or slide, and means set by the drawing out of the cover which prevents the same from being again drawn out after the cover has been pushed back, substantially as described.

129. A voting-machine, comprising a casing with a drawer or box placed therein, counters provided in said box, a movable cover for the box, and which in one of its positions permits the operation of said counters and when in its other position prevents the operation thereof, and means in said casing, and independent of said drawer, whereby said counters are normally operative, substantially as described.

130. The combination of the casing of the voting-machine with the drawer to be inserted therein and containing the counter devices, a movable cover for said drawer, a lever attached to the same, and arranged within the box or drawer, and projecting through the bottom thereof, to be operated by the insertion of the drawer to move said cover, and a pawl and a shifting ratchet provided within the drawer, and whereby said cover is locked when it has been twice moved in the same direction, substantially as described.

131. In a voting-machine, the combination of counter-actuating devices with counter devices, the case wherein said parts are normally relatively stationary throughout the period of voting and said counters being arranged in or upon a suitable drawer or slide whereby they may as a whole be removed from said casing and separated from the actuating mechanisms, and said counters being concealed until said drawer is so removed, substantially as described.

132. In a voting-machine, the combination of counter-actuating devices with counter devices, the case wherein said parts are normally relatively stationary throughout the period of voting, and said counters being arranged in or upon a suitable drawer or slide whereby they may be removed from said casing and separated from the actuating mechanisms, and means whereby upon or before the withdrawal of said counters from said casing said counters are automatically secured against further operation, substantially as described.

133. In a voting-machine, the combination of the movable belts and the keys or buttons thereon, with the rows of counter-actuators and the counters, belt-locking means whereby one only thereof may be operated at a time, means limiting the number of counters which may be operated by one voter, means concealing said counters and means whereby the machine is rendered inoperative to record further votes after said counters are exposed to view, substantially as described.

134. In a voting-machine, the combination of a series of counters or registers, with means for concealing the same from view, a series of counter-actuators, automatically-operating means for locking said actuators against further operation when an attempt is made to uncover or view said counters, whereby the machine is rendered inoperative to record further votes, substantially as described.

135. In a voting-machine, the combination of the counters or registers, and the actuating mechanism, with means for concealing said counters, and a slide operating to prevent further operation of said actuators when an attempt is made to continue the voting after the counters have been exposed to view, substantially as described.

136. In a voting-machine, the combination of the counters or registers and the actuating mechanisms, with means concealing said counters or registers, and a means whereby said counters are secured against further operation by the act of exposing said counters to view, substantially as described.

137. In a voting-machine, the combination of a series of counters with a series of actuators, and means locking said counter-actuating devices against further operation as the counters are being exposed to view, substantially as described.

138. In a voting-machine, the combination of a series of counter-actuating devices, counters operatively connected with actuating devices, and means for interrupting or breaking said operative connection between said actuating devices and said counters, and automatically operated when the counters are exposed to view, substantially as described.

139. The combination, in a voting-machine, of the frame, with the plunger or actuator, to slide therein, means for moving the same, a pawl to engage the plunger, and a single spring acting upon both said plunger and said pawl, substantially as and for the purpose described.

140. In a voting-machine, the combination of two or more rows of counter devices with the actuating devices therefor, means for preventing the operation of more than one of said actuators at a time, automatically-operating means limiting the number of operations of said counters, means concealing said counters, and automatic means securing said counters against further operation when, or as, the same are once exposed to view, substantially as described.

141. In a voting-machine, the combination of counter devices, with means operating therewith and common thereto, one-direction interchangeable limiting mechanisms adapted to operation with said means, said interchangeable mechanisms having permanent stop parts, to the end that by changing said mechanisms the machine may be quickly adapted to different requirements for selective voting, substantially as described.

142. The combination in a voting-machine of movable counters and actuators therefor with means normally concealing said counters and a mechanism operated to lock said actuators before the movement of said counters to expose the counters or the count to view, substantially as described.

143. In a voting-machine, the combination of two or more rows or series of counter devices representing two or more offices, with means whereby said rows are connected, and means independent of the connecting means preventing the operation of more than any one of said devices at a time, substantially as described.

144. In a voting-machine, the combination of two or more rows or series of counter devices, representing two or more offices, with means whereby said rows are connected, a mechanism limiting the number of said devices which may be operated by a voter, and means independent of said connecting and said limiting means preventing the operation of more than one of said devices at a time, substantially as described.

145. The combination with a suitable casing of a series of counter-actuating devices provided therein, the counters to be operated thereby, a perforated slide or covering for said counters through which said actuating devices may operate upon said counters throughout the voting period, and said slide being movable only before the counters are exposed to view, to prevent the further operation of said counters, substantially as described.

146. In a voting-machine, the combination of a series of groups of counter devices, with one operator for each group and an operator-locking mechanism capable of several operations by the same voter and which said voter is compelled to operate before any device may be worked by an operator, substantially as described.

147. In a voting-machine, the combination of a series of groups of counter devices, with one operator for each group, and a locking mechanism connecting the several operators adapted to lock all but any one thereof, and which the voter is compelled to operate before any device may be worked by the operator which the voter chooses, substantially as described.

148. In a voting-machine, the combination of two or more series of individual counter devices with a separate series of straight-ticket devices, and said straight-ticket devices being operable by the same operator employed for single separate operations of individual counter devices, substantially as described.

149. In a voting-machine, the combination of two or more series or rows of counter devices with means covering all of said counter devices but permitting the operation of any one thereof at a time, and, operating means whereby said counter devices may be operated, one at a time, substantially as set forth.

150. In a voting-machine, the combination of two or more rows of counter devices with operating means and means protecting or securing all of said counter devices and permitting the operation of but one thereof at a time by said operating means, substantially as described.

151. In a voting-machine, the combination of two or more rows or series of counter devices adapted to be operated by a voter with a suitable frame or casing inclosing the same, a movable device covering or protecting each series of counter devices, and automatic means preventing the operation of more than one of said movable devices at a time, substantially as described.

152. In a voting-machine, the combination of the rows of counters and counter-actuating devices representing political tickets and in which the individual devices represent candidates, with means preventing the operation of more than one at a time of the actuators in any transverse row of devices included in the first-mentioned rows, and limiting means movable always in one direction only, operatively connecting the counter-actuating devices and preventing the operation of more than a given number thereof by one voter, but after further movement permitting the operation of said devices by another voter, substantially as described.

153. In a voting-machine, the combination of a series of tiers of counter devices with a rotary limiting device for each tier, rotary means positively connecting said rotary limiting devices and independent limiting means common to the limiting devices of all the tiers that are connected, and preventing the operation of more than a given number of said devices in all said tiers, substantially as described.

154. In a voting-machine, the combination of two or more tiers of counter devices with a limiting-shaft for each tier and each movable with each counter device in its tier, a stop in connection with each said shaft, and a movable stop device, for engagement therewith also provided in connection with each shaft and readily removable therefrom to permit the interchange thereof for different movable stop devices adapted to the requirements of a different election, substantially as described.

155. In a voting-machine, the combination of two or more rows or tiers of voting mechanisms, with a manual operator for each row, and a limiting mechanism positively operated by said operators and limiting the number of possible operations thereof, substantially as described.

156. The combination, in a voting-machine, of the counters and the actuators, with annunciators, and interlocking devices preventing the operation of more than any one annunciator at a time, substantially as described.

157. In a voting-machine, the combination of the actuators and the counters with securing devices for said actuators, a mechanism adapted to yield to pressure, to lock all but one of said securing devices against operation and limiting devices in connection with said actuators whereby the number of operable actuators is limited and whereby all are locked after a given number has been operated, substantially as described.

In testimony whereof I have hereunto set my hand this 6th day of May, A. D. 1897.

JAMES H. DEAN.

In presence of—
C. G. HAWLEY,
M. E. GOOLEY.